United States Patent
Caballero-McCann et al.

(10) Patent No.: US 7,853,696 B2
(45) Date of Patent: Dec. 14, 2010

(54) SYSTEM AND METHOD FOR PROVIDING AN ECAMP FEATURE IN A SESSION INITIATION PROTOCOL (SIP) ENVIRONMENT

(75) Inventors: Denise G. Caballero-McCann, Raleigh, NC (US); Stephen Levy, Cary, NC (US); Shamim S. Pirzada, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1325 days.

(21) Appl. No.: 10/993,681

(22) Filed: Nov. 19, 2004

(65) Prior Publication Data
US 2006/0165058 A1    Jul. 27, 2006

(51) Int. Cl.
*G06F 15/16* (2006.01)

(52) U.S. Cl. .................. 709/227; 709/204; 379/265.01

(58) Field of Classification Search ............ 379/266.02, 379/265.06, 212.01; 709/204
See application file for complete search history.

(56) References Cited

U.S. PATENT DOCUMENTS

| | | | |
|---|---|---|---|
| 3,963,874 A | 6/1976 | Pommerening et al. | 179/18 |
| 4,577,067 A | 3/1986 | Levy et al. | 179/99 |
| 4,809,321 A | 2/1989 | Morganstein et al. | 379/211 |
| 5,577,111 A | 11/1996 | Iida et al. | 179/99 |
| 5,809,130 A | 9/1998 | Ayala | |
| 5,812,551 A | 9/1998 | Tsukazoe et al. | 370/399 |
| 6,118,861 A | 9/2000 | Gutzmann et al. | 379/201 |
| 6,125,178 A | 9/2000 | Walker et al. | 379/211.01 |
| 6,178,237 B1 | 1/2001 | Horn | 379/202 |
| 6,453,022 B1 | 9/2002 | Weinman, Jr. | 379/88.13 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,618,476 B1 | 9/2003 | Szeto et al. | 379/198 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,396 B1 | 12/2003 | Khouri et al. | 379/266.01 |
| 6,665,723 B2 | 12/2003 | Trossen | 709/227 |
| 6,678,735 B1 | 1/2004 | Orton et al. | 709/230 |

(Continued)

OTHER PUBLICATIONS

H. Schulzrinne and C.Agboh, "Session Initiation Protocol (SIP)-H. 323 Interworking Requirements," RFC 4123, 15 pages, Jul. 2005.

(Continued)

*Primary Examiner*—Fan Tsang
*Assistant Examiner*—Simon King
(74) *Attorney, Agent, or Firm*—Baker Botts L.L.P.

(57) ABSTRACT

A method for facilitating a data session in a session protocol environment is provided that includes identifying a first endpoint and receiving a status indicator as to whether the first endpoint is available to participate in a communication session that involves the first endpoint and a second endpoint. In a more particular embodiment, the first endpoint is operable to recognize that the second endpoint is seeking to contact the first endpoint in order to conduct the communication session.

18 Claims, 6 Drawing Sheets

U.S. PATENT DOCUMENTS

| | | | |
|---|---|---|---|
| 6,684,147 B2 | 1/2004 | Park et al. ..................... 701/71 |
| 6,694,008 B1 | 2/2004 | Mukherji et al. ............. 379/228 |
| 6,731,625 B1 | 5/2004 | Eastep et al. ................. 370/352 |
| 6,738,390 B1 | 5/2004 | Xu et al. ...................... 370/467 |
| 6,751,310 B1 | 6/2004 | Crossley ...................... 379/266 |
| 6,754,181 B1 | 6/2004 | Elliott et al. ................. 370/252 |
| 6,760,322 B1 | 7/2004 | Fukuda et al. ............... 370/352 |
| 6,785,246 B2 | 8/2004 | Foti ............................ 370/261 |
| 6,785,560 B1 | 8/2004 | Chow et al. .................. 455/564 |
| 6,788,676 B2 | 9/2004 | Partanen et al. .............. 370/352 |
| 6,970,547 B2 | 11/2005 | Andrews et al. ........ 379/201.01 |
| 7,006,618 B1 | 2/2006 | Shaffer et al. ........... 379/215.01 |
| 7,480,260 B1 | 1/2009 | Vashisht et al. .............. 370/260 |
| 2002/0078150 A1* | 6/2002 | Thompson et al. ........... 709/204 |
| 2003/0081752 A1 | 5/2003 | Trandal et al. .......... 379/210.01 |
| 2004/0062383 A1* | 4/2004 | Sylvain ................. 379/265.06 |
| 2004/0203660 A1 | 10/2004 | Tibrewal et al. ........... 455/414.1 |
| 2005/0238162 A1* | 10/2005 | Dezonno ............... 379/265.09 |
| 2006/0007954 A1 | 1/2006 | Agrawal et al. ............. 370/466 |

OTHER PUBLICATIONS

J. Rosenberg and H. Schulzrinne, "An Offer/Answer Model with the Session Description Protocol (SDP)," RFC 3264, 24 pages, Jun. 2002.

J. Rosenberg, H. Schulzrinne, and P.Kyzivat, "Caller Preferences for the Session Initiation Protocol (SIP)," RFC 3841, 25 pages, Aug. 2004.

H. Schulzrinne and S. Petrack, "RTP Payload of DTMF Digits, Telephony Tones and Telephony Signals," RFC 2833, 27 pages, May 2000.

A.B. Roach, "Session Initiation Protocol (SIP)-Specific Event Notification," RFC 3265, 34 pages, Jun. 2005.

J. Rosenberg, H. Schulzrinne, G. Camarillo, A. Johnston, J. Peterson, R. Sparks, M. Handley, and E. Schooler, "SIP: Session Initiation Protocol ," Network Working Group, RFC 3261, 269 pages, Jun. 2002.

R. Mahy et al., "Remote Call Control in SIP using the REFER method and the session-oriented dialog package," Internet Draft (no longer posted on Internet), The Internet Society, 35 pages Feb. 2004.

R. Mahy et al., "Remote Call Control in Session Initiation Protocol (SIP) using the REFER method and the session-oriented dialog package," Internet Draft, http://www.letf.org/internet-drafts/draft-mahy-sip-remote-cc-03.txt, The Internet Society, 14 pages Mar. 5, 2006.

R. Mahy, et al., "The Session Initiation Protocol (SIP) 'Join' Header," The Internet Society, RFC 3991, http://wvvw.ietf.org/rfc,/rfc3911.txt, 15 pages, Oct. 2004.

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

Shaffer, et al. "Method and System for Providing a Camp-On Service," U.S. Appl. No. 11/101,704, filed Apr. 8, 2005, publication No. 2006-0227949 dated Oct. 12, 2006.

Shaffer, et al. "Method and System for Providing a Camp-On Hold Service," U.S. Appl. No. 11/271,705, filed Nov. 11, 2005, publication No. 2007-0121878 dated May 31, 2007.

PCT Notification of Transmittal of the International Search Report and the Written Opinion of the International Searching Authority, or the Declaration mailed Aug. 8, 2007, re PCT/US06/39367 filed Oct. 6, 2006.

Office Action for U.S. Appl. No. 11/271,710, (20 pages) Apr. 1, 2009.
Office Action for U.S. Appl. No. 11/101,704, (20 pages) Mar. 6, 2009.
Office Action for U.S. Appl. No. 09/990,688, (5 pages) Jun. 7, 2005.
Office Action for U.S. Appl. No. 09/990,688, (3 pages) Jan. 21, 2005.
Office Action for U.S. Appl. No. 09/990,688, (9 pages) Nov. 2, 2004.
Office Action for U.S. Appl. No. 09/990,688, (7 pages) Jul. 30, 2004.
Office Action for U.S. Appl. No. 09/990,688, (8 pages) Feb. 2, 2004.
Shaffer et al, U.S. Appl. No. 11/101,704, Communication from the U.S. Patent and Trademark Office mailed Aug. 18, 2009.

Office Action for U.S. Appl. No. 11/101,704, (18 pages), Mar. 9, 2010.

* cited by examiner

SYSTEM AND METHOD FOR PROVIDING AN ECAMP FEATURE IN A SESSION INITIATION PROTOCOL (SIP) ENVIRONMENT

RELATED APPLICATION

This Application claims the benefit under 35 U.S.C. §119 (e) of U.S. Provisional Application Serial number 60/589,198 entitled: "Supporting Collaborative Communications Using Peer to Peer Signaling," filed on Jul. 19, 2004.

TECHNICAL FIELD OF THE INVENTION

This invention relates generally to communications and, more particularly, to a system and a method and for providing an eCamp™ feature in a session initiation protocol (SIP) environment.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, one problem often encountered by a caller in any communications environment is being unable to reach a callee because the callee is not available. The called party may be unavailable for the call for any number of reasons. For example, the called party may be out of the office, on another line, e-mailing another party, preparing a document, talking on their cellular telephone, etc. However, the calling party is oblivious to this information, as he has no idea how to effectively contact this person. In some situations where the callee is busy, the caller can leave a simple voicemail or send them an e-mail (i.e. facilitate the phone-tag scenario). However, in some instances, a live discussion is necessary, whereby an interactive session can be accommodated.

This lack of knowledge and lack of interaction wastes valuable time, frustrates both parties, causes delays in communications, and inhibits productivity. Accordingly, this problem is a burden for any employee, employer, individual, or endpoint that seeks to execute a successful and productive communication session.

SUMMARY OF THE INVENTION

From the foregoing, it may be appreciated by those skilled in the art that a need has arisen for an improved process that provides an effective solution for participants in a communications architecture. In accordance with an embodiment of the present invention, a system and a method for initiating and establishing a call, as well as identifying availability associated with the requested party, are provided that substantially eliminate or greatly reduce disadvantages and problems associated with conventional communication strategies and protocols.

According to an embodiment of the present invention, a method for facilitating a data session in a session protocol environment is provided that includes identifying a first endpoint and receiving a status indicator as to whether the first endpoint is available to participate in a communication session that involves the first endpoint and a second endpoint. In a more particular embodiment, the first endpoint is operable to recognize that the second endpoint is seeking to contact the first endpoint in order to conduct the communication session.

Certain embodiments of the present invention may provide a number of technical advantages. For example, according to one embodiment of the present invention, an architecture and a process are provided that avoids time-consuming endeavors that inhibit productivity. Hence, the proverbial "phone-tag" scenario is effectively avoided by the present invention. Note that the offered communication system offers an interactive approach or a "live" protocol for associated participants. Also, a higher number of successful calls are completed using the eCamp™ feature, which vastly improves efficiency parameters. Moreover, such a protocol may be performed with minimal individual effort from the either the sender or the receiver of the information, as the eCamp™ feature may be performed autonomously. This would allow high-quality data to be quickly obtained and clearly displayed in the context of any SIP session.

In addition, such an architecture can readily be extended to conference call scenarios involving multiple requested participants. The present invention provides exceptional flexibility in its applications. In addition, the problem associated with which camper is granted access to a campee when the campee becomes available is solved by creating a prioritized list. Such a prioritized list may be managed by the campee so that the campee may select who may be granted access to his telephone. A further technical advantage involves problems associated with campers who are no longer available. For example, by only placing the call between the camper and the campee when the camper has an "open" status, canceling of the camp can be avoided. Further, by including a time-out feature associated with a camper who does not answer the phone, incessant ringing of a particular camper can be avoided.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
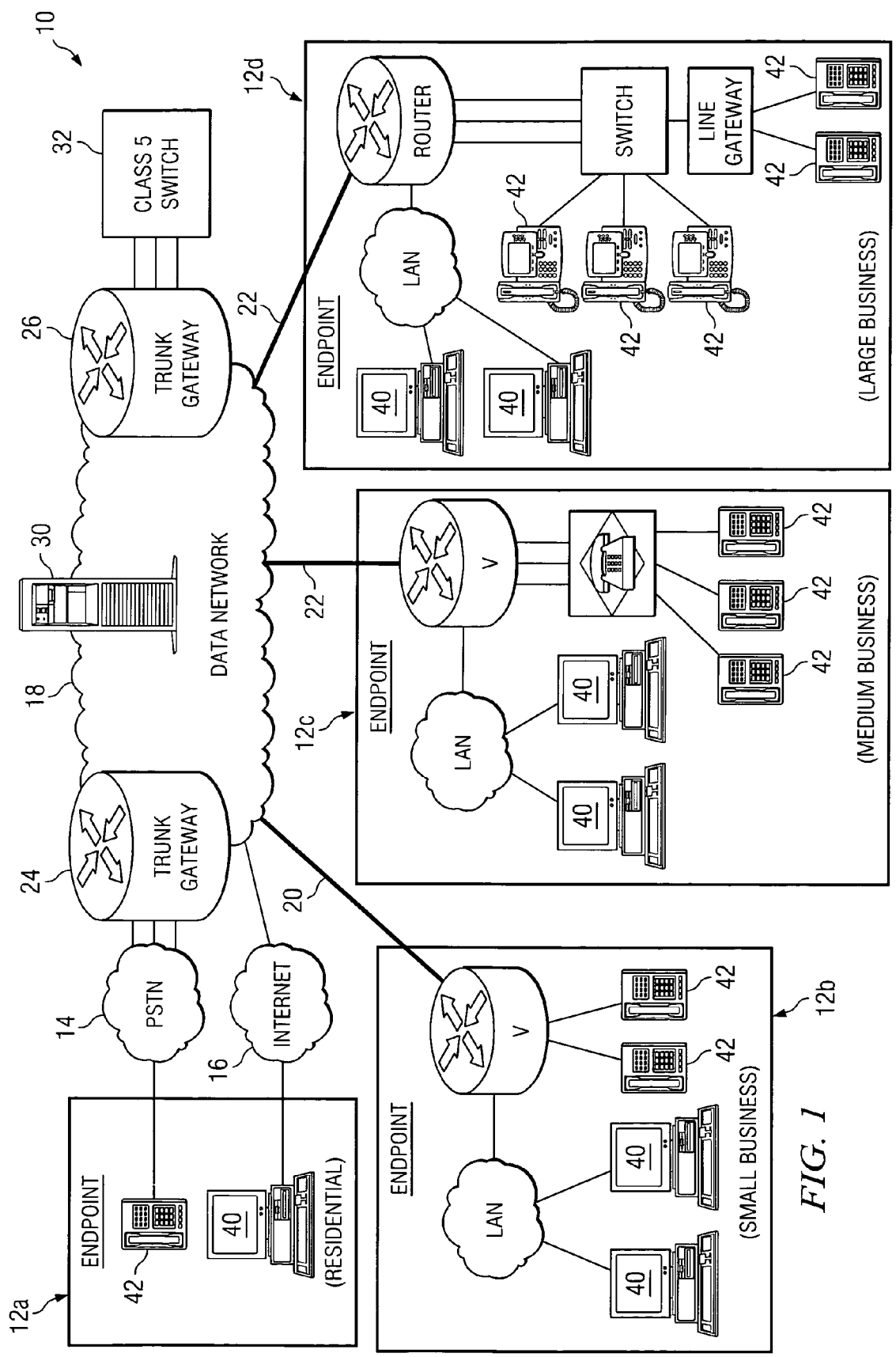
FIG. 1 is a simplified block diagram illustrating a communication system that may implement an eCamp™ feature in accordance with one embodiment of the present invention.

FIG. 1 is a simplified block diagram of a communication system 10 for communicating, receiving, and transmitting data in a session initiation protocol (SIP) environment. Communication system 10 includes endpoints 12a-12d, a public switched telephone network (PSTN) 14, an Internet 16, a data network 18, a broadband access link 20, and a number of additional links 22 (which may include, for example, a digital subscriber line (DSL) link, a T1 link, a fiber optic link, and a wireless link). Communication system 10 also includes a set of trunk gateways 24 and 26, a 3rd-party application server 30, and a Class-5 switch 32.

Endpoint 12a represents a residential location, which consists of a computer 40 and several telephones 42. Telephones 42 may be an Internet protocol (IP) telephone or a standard telephone that is operable to interface with computer 40 such that one or more capabilities of SIP are enabled through telephone 42. Accordingly, two types of telephones are illustrated in FIG. 1. Endpoint 12b represents a small business entity, which consists of a local area network (LAN), a router, several computers 40, and several telephones 42. Endpoint 12c represents a medium business entity, which consists of a LAN, router, a private branch exchange (PBX) or key system, several computers 40, and several telephones 42. Endpoint 12d is a large business entity, which consists of a LAN, a router, a switch, a line gateway, several computers 40, and several telephones 42.

In accordance with the teachings of the present invention, commutation system 10 offers a new eCamp™ technology service that allows for an effective contact, status indication, and establishment of an optimal call session for a calling party. This provides any number of benefits for users of the system. For example, this allows the caller to effectively notify a callee of his need to speak with that individual. The entity that is being targeted for the call is a "persona." The persona represents an aggregation of the various devices and/or logical addresses that can be used by a person to communicate with another. For example, the persona of an employee named Denise could be represented by her phone number, her fully qualified domain name, her e-mail address, and/or the IP address port of her Instant Messaging application on her personal computer. Any number of these variables (or others) could be used to reflect Denise's persona.

Leveraging this concept of persona, communication system 10 offers the ability to monitor a given entity and to subscribe to be notified when the persona is active in the context of several types of communication modes (i.e. telephone, e-mail, video phone, Instant Messaging, etc.). In addition, the persona who receives the eCamp™ can be offered the ability to reject it on all (or on some) communication devices. Such an option allows the persona to elect to respond to the eCamp™ with a preferred communication device at any appropriate time. For example, if a persona (e.g. Denise) is camped onto by her supervisor (e.g. Steve) and she is preoccupied with some task involving her phone, she can receive a notification on her Instant Messaging platform that Steve has camped onto her persona. In such an example, she could respond (e.g. via a "CAN message" on her telephone or by using Instant Messaging) that she would rather communicate with Steve using Instant Messaging, or she could simply notify Steve to call her at a later time. The potential applications of such a persona capability are virtually boundless and more fully detailed below.

In more simplistic scenarios, the eCamp™ presence functionality enables a person (e.g., a "watcher," a status monitor, an attendant, an agent, a co-worker, etc.) to identify the availability of another individual (e.g. a presentity or a persona). For example, a watcher (John) may see that a presentity (Jill) is on-hook, off-hook, etc. In cases where John views a given directory and sees that Jill is unavailable (e.g. she is at lunch, she is in a conference call, not in the office, or the in the case of Instant Messaging (IM) an 'away' notification may be provided), John can respond by pressing the eCamp™ button. Once initiated, the eCamp™ feature monitors the status of the individual. If the status of the targeted individual changes (e.g. the 'away' status is removed, whereby a transition occurs that reflects Jill is now available), John could be notified of this change. Note that this transition in status may simply be executed at the desktop or by the network in some automated fashion (or provided remotely where appropriate).

The notification to John may be provided by a simple pop-up message provided to John's endpoint device (e.g. an IP telephone, his personal computer, his laptop, cellular telephone, etc.). John could then depress another button, which establishes the call to the now-available party. John could also be afforded the opportunity to camp onto multiple extensions. For example, John may be seeking to set up a conference call with Jill, Denise, and Steve. John may initially determine that one or more of these individuals are not available for the call. John may then opt to camp onto each of these connections such that once all of these individuals are available for the call, he can be properly notified. Then the conference call can readily be facilitated and successfully completed with all the requisite participants. Hence, the eCamp™ feature allows an end user to press a simple conference button and select multiple targeted parties. The eCamp™ feature can wait until the parties are available and then launch (e.g. via a "Dial function") the call. The system effectively sets up an ad hoc conference call between the selected parties. The system also informs all parties that there are eCamped conference outstanding.

The eCamp™ feature is flexible and user-configurable and, thus, can accommodate any number of scenarios. For example, John may get caught in a meeting while he is awaiting notification of availability of the other participants of the conference call. John could elect to be re-notified in 15 minutes (i.e. the amount he is currently being delayed because of the meeting he is in) about the current availability of the participants. If the participants are still open for the conference call, the call can be initiated by John. In a similar fashion, John could elect to be notified in an hour as to the availability of any targeted participant. For example, if Jill were originally unavailable at 1:00 PM, John could request that this availability be rechecked at 2:00 PM.

For management purposes, the eCamp™ feature could include a camp list. For example, John could be a technical leader in his company. In such an example, John may be supervising nine other employees. When John is ready to schedule a meeting that implicates all of his team members, he could simply select the management function of the eCamp™ feature. John would then be effectively camped onto each of the team member's extensions. The camp list, as well as single camping applications identified above, can be redirected, edited, placed back in certain queues, or changed in any suitable manner. Hence, all the employees in this scenario reflect a group of individuals that share a common character trait (i.e. they belong to the same department). Other character traits could easily be accommodated by the present invention.

Priorities could also be designated using the eCamp™ protocol. For example, John may need to speak with Jill before talking with either Steve or Denise. Hence, Jill could be assigned a different priority value than Steve and Denise, which share the same priority value (i.e. priority level). The eCamp™ feature is able to recognize that John should not speak with Denise or Steve before discussing his issue with Jill. Once John has spoken with Jill, the eCamp™ feature would then turn to Steve and Denise for a subsequent SIP session. After discussing the pending issue with Steve and Denise, the eCamp™ feature may move to the next priority value and so forth. The individual corresponding to that next priority level would then be contacted by the system. A number of additional examples are provided herein in this document and detailed below with reference to FIGS. 2-4C.

Note that communication system 10 can accommodate any number of preferences (i.e. previous elections) of a given end user (e.g. a preferred mode of communication [IM, video, etc.] or a persona). For example, the eCamp™ feature can allow an end user to elect that a given person (e.g. the end user's wife) to camp onto him (i.e. his extension), but his supervisor may not be afforded this same ability. In addition, the wife may be able to communicate with the end user using an IP telephone, but the supervisor can only communicate with the end user using IM. This could be executed by leveraging existing preferences or policies with a presence status. Any suitable preference or policy may be readily accommodated and accounted for by the tendered architecture.

Endpoints 12a-d are SIP-compatible elements that include hardware and/or software that is operable to receive and to transmit data (directly or indirectly) and to implement the eCamp™ feature as outlined herein. Note that the term "endpoint" encompasses a myriad of potential devices and infrastructure that may benefit from the operations of communication system 10. Endpoints 12a-d may be a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of endpoints 12a-d are malleable and can be readily changed, modified, rearranged, or reconfigured in order to achieve their intended operations as they pertain to the eCamp™ function. As identified supra, software and/or hardware may reside in endpoints 12a-d in order to achieve the teachings of the eCamp™ feature of the present invention. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

There are many applications that require the creation and management of a session, where a session is considered an exchange of data between an association of participants. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

SIP currently does not offer conference control services such as floor control or voting and does not prescribe how a conference is to be managed. SIP can be used to initiate a session that uses some other conference control protocol. Since SIP messages and the sessions they establish can pass through entirely different networks, SIP cannot, and does not, provide any kind of network resource reservation capabilities. Quality of service (QoS) parameters may also be accommodated by SIP (e.g., see RFC 3311).

The nature of the services provided make security particularly important. To that end, SIP provides a suite of security services, which include denial-of-service prevention, authentication (both user to user and proxy to user), integrity protection, and encryption and privacy services.

Figure 2:
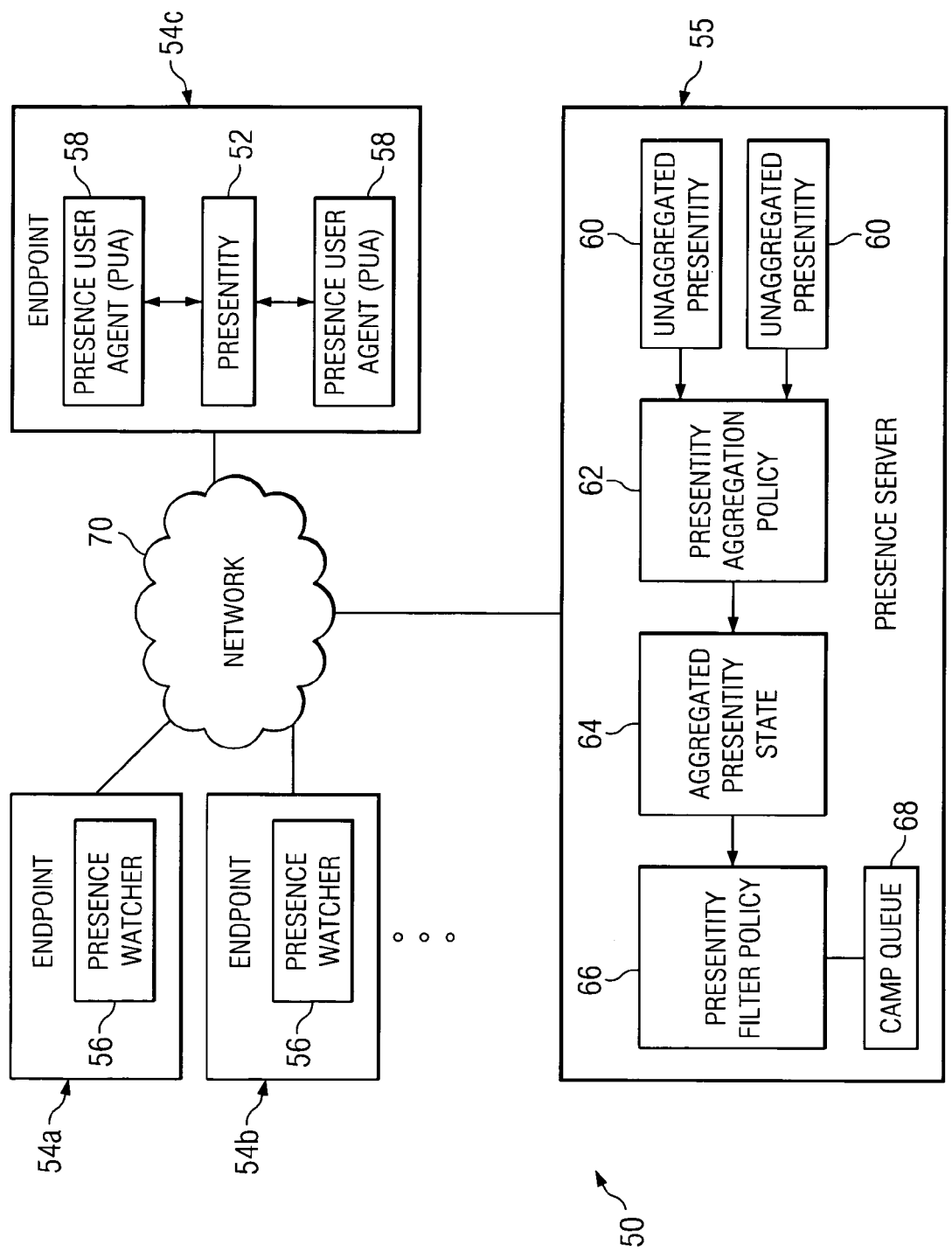
FIG. 2 is a block diagram illustrating a presence server in conjunction with a plurality of presence user agents and presence watchers according to the teachings of one embodiment of the invention.

FIG. 2 is a block diagram of an example system 50 for use in providing camp functionality through a plurality of campees. System 50 may include multiple endpoints 54a-c and a simple network 70, which is operable to facilitate communications to and from endpoints 54a-c. In this example, endpoints 54a-b represent entities seeking to watch the status of endpoint 54c. System 50 also includes a presentity 52, a presence server 55, and a plurality of presence watchers 56. Presentity 52 represents a particular party with whom communication is desired, such as a called party or callee. Presence server 55 is a single computer or group of computers that is capable of receiving presence information regarding one or more presentities 52 and selectively provide that information to presence watchers 56. Examples of presence servers include presence servers as defined by IETF specifications. Presence watchers 56 represent entities that wish to obtain presence information about one or more presentities 52. Presence information may include information about whether presentity 52 is on the phone, whether presentity 52 is logged onto a computer, whether presentity 52 is in a particular location, or other types of information generally regarding the availability, location, or activity in which presentity is engaged.

A plurality of presence user agents (PUA) 58 are also illustrated. Presence user agents 58 obtain particular information about an aspect of the presence of presentity 52. One example of a presence user agent 58 is software or hardware embodied in a telecommunications switch that determines the hook status of a telephone associated with presentity 52. Another example of a presence user agent is software that monitors whether a computer associated with the presentity 52 is logged onto. A third example of presence user agent is a device that communicates with an ID tag worn by presentity 52 to indicate the location of presentity 52. Yet another example of a presence user agent is an IP phone. Although particular presence user agents are described, a variety of presence user agents may be utilized according to the teachings of the invention included those yet to be developed. Presence user agents 58 determine a presence status of presentity 52 and provide status to presence server 55.

Unaggregated presentity block 60 of presence server 55 receives one or more indications of the presence of presentity 52 from one or more presence user agents 58. This information is aggregated according to a presentity aggregation policy by presentity aggregation policy block 62. One example of such a policy is that if all presentity statuses are green (or "open") then the aggregated presence of the presentity is green, but if any of the presentity statuses are red (or "closed") then the presence of presentity 52 is red.

Presentity aggregation policy block 62 outputs the aggregated presentity state to aggregated presentity state block 64. Aggregated presentity state block 64 provides this aggregated presentity state to a presentity filter policy block 66.

Presentity filter policy 66 may implement policies to selectively provide the presentity state of presentity 52 to one or more presence watchers 56 such that the state may differ depending on the identity of presence watcher 56. In implementing this function, a camper queue 68 may be utilized to determine the order in which the presentity status of presentity 52 is provided to any particular presence watcher 56.

The teachings of the invention recognize some limitations on traditional camp-on services. For example, the inability to determine whether the camper, also referred to here as the caller, is available when the callee becomes free is problematic. This can result in the camp feature either being canceled, or in the camper's phone ringing incessantly. In addition, it is difficult to camp-on callees that do not answer their phone, rather than the phone merely being busy. Furthermore, the inability of the callee to manage the list of campers is less than desirable. In addition, it is believed that traditional systems do not adequately address multiple campers camping on a single campee.

According to some of the teachings of the invention, the above-identified limitations on traditional camp-on service are addressed, in some embodiments of the invention. For example, the presence state of the callee can be used to extend the camp function to no-answer cases. Further, the presence state of the camper can be used to avoid the camper's phone when the camper is no longer present. The campee can examine the state of various campers and manage the order in which they receive access or deny access to undesirable campers. According to one embodiment of the invention, a camper queue is maintained that stores a plurality of campers in a prioritized list. Thus, the particular camper of a plurality of campers that are camping on the same campee that is granted access first to the campee when he becomes available can be specified. In one example, the particular person that is granted access first is the first camper to camp on the campee. Thus, campers are treated on a first-in first-out basis. However, other priority determinations may be utilized, including prioritization that is based upon the campee's input, as well as prioritization that is based on other predetermined rules, such as the identity of the camper.

In particular, according to one embodiment of the invention, a "camp-on queue" filter policy is implemented in a presentity filter policy block 66 in presence server 55 or specified campee presentities 52. According to this filter embodiment, only one queue element at a time can be notified that the campee (presentity 52) is open. This prevents all campers from jumping on the campee simultaneously when the campee becomes available. Campers utilizing presence watchers 56 make requests to be added or removed from the camp queue 68. This can be done through any suitable protocol or can be done by watching a special "camp-on" presentity associated with each campee. Campers in the queue have a fixed amount of time to complete a call to the campee. If they fail to complete the call they are temporarily disabled, assuming the camper is unavailable. The temporarily disabled camper will be re-enabled later in an attempt to complete the call. Campers can also be disabled if their own presentity shows that they are closed; in other words, campers may be disabled when they are unavailable.

In one embodiment, campers have priority over normal, non-camp watchers. While there are active campers, normal watchers always see the campee as "closed," or in other words busy. When all campers are disabled, or when there are no campers, non-camped watchers receive open presence information about the campee. In addition, according to one embodiment, campees can query the current state of the camper queue 68 and can re-order the priority of campers in that queue.

It should be noted that the internal structure of the system of FIG. 2 is malleable and can be readily changed, modified, rearranged, or reconfigured in order to achieve its intended operations or additional operations. Additionally, any of the items within FIG. 2 may be combined, where appropriate, or replaced with other functional elements that are operable to achieve any of the operations described herein.

Figure 3:
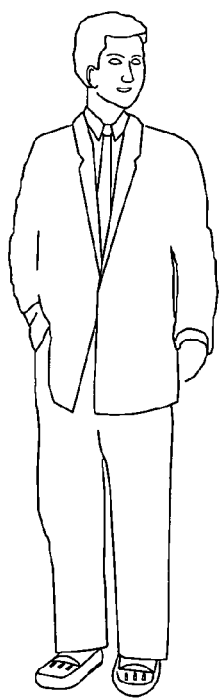
FIG. 3 is a simplified block diagram of an example operational flow of the communication system of FIG. 1.
Figure 3:
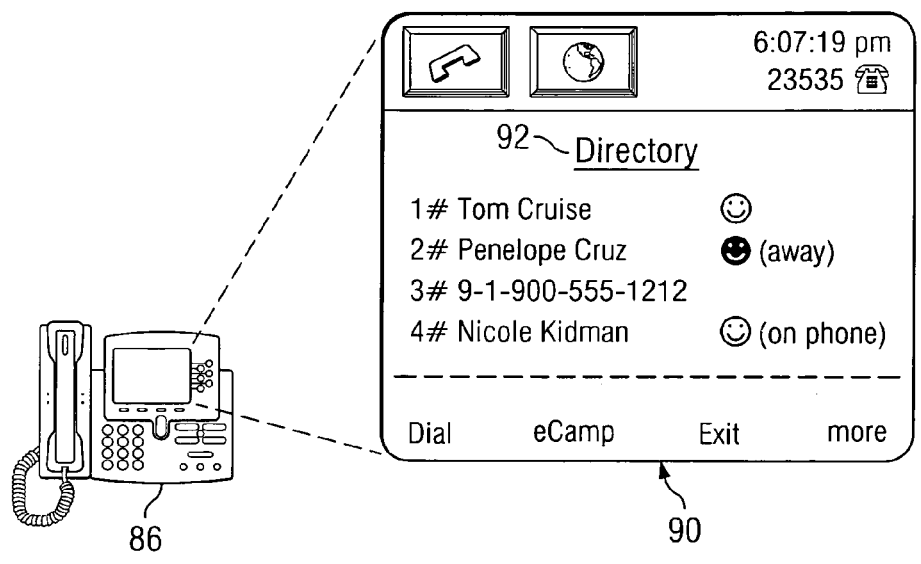

FIG. 3 is a simplified block diagram of an example operational flow of the communication system of FIG. 1. FIG. 3 includes an IP telephone 86, which includes a display 90 that includes a directory 92. In addition, IP telephone 86 includes an eCamp™ feature provided on a button that, when depressed, can initiate the eCamp™ feature as outlined herein.

FIG. 3 illustrates a case where John (the end user illustrated) seeks to talk to Penelope. Through the SIP architecture and the eCamp™ feature, John sees the Penelope is unavailable. Rather than leave a voice-mail message or an Instant Message, John elects to camp onto her extension. Thus, John is afforded the opportunity to generate a subscription to this extension. A presence server could then aggregate whether these two individuals are corresponding using IM or whether Penelope is out of the office today, etc. The presence state may be aggregated from all devices belonging to the call originator. Virtually any condition associated with a called party can be identified and, further, used to assist the calling party in his endeavors. All such conditions may be generally referred to as a "status indicator" as used herein in this document. Note that all of the data sets from each of the endpoints may be aggregated by presence server 55. Each data set may include availability parameters or any other suitable status indicator. Such data sets may represent profile information for each endpoint.

The eCamp™ feature may also inform Penelope that John has camped onto her extension. This could be beneficial in cases where John is eager to speak with Penelope and Penelope is being occupied by something trivial. For example, John may be having a last-minute work crisis that could be easily resolved by Penelope. Penelope could simply be having a phone conversation with her mother about an upcoming birthday party. Thus, without knowing anything about John's quandary, Penelope would continue the call with her mother. However, using the eCamp™ feature, Penelope could see that John is anxious to speak with her and immediately disconnect with her mother and then receive John's call.

The eCamp™ feature display illustrated in FIG. 3 can appear in cases where the system knows the presence state of the person. In this example scenario involving Penelope, this state shows she is 'away.' Also provided in directory 92 is information that indicates that Nicole is on the phone at this time. Other indicators could signify that an individual is absent from work due to illness or vacation. Still other indicators could reflect that the individual is in a meeting until a prescribed time. Other indicators are provided below and detailed more fully herein.

Note that the benefits of the eCamp™ feature can be achieved by a single person or endpoint in cases where the contacted endpoint is using a standard analog telephone. The person invoking this feature can still ascertain the status of the called party. Hence, even in cases where Penelope uses a traditional telephone set-up, John would still be able to identify that she is 'away' from her workstation at this time. John could also determine if Penelope has invoked certain services, whether or not she is off-hook or on-hook, or any other suitable activity status indication.

The information gathering strategies provided by the eCamp™ feature minimize delays and provide an optimal strategy for contacting the targeted endpoint. In some embodiments of the present invention, any number of pop-up messages can be used to guide or to direct the calling party to the best possible protocol for contacting the targeted person. For example, a pop-up message for John could offer him the option of contacting Penelope through Instant Messaging. Through the eCamp™ feature, John could recognize that Penelope is using her laptop keypad or a personal computer. In order to effectively contact Penelope, John could contact Penelope using Instant Messaging, which could easily ping Penelope in her current environment. In this scenario, a simple Instant Messaging option or button could be offered to John such that, when selected, it could trigger the Instant Messaging capability directly from John's endpoint. Thus, the eCamp™ feature can display any number of media options from which John can make his desired selection. In still other scenarios, John may recognize other presence information associated with Penelope's wireless capabilities. Hence, John could see that Penelope's mobile telephone is turned ON and that Penelope's mobile telephone is not being used. John could then just latch onto that connection and contact Penelope on her mobile telephone.

Figure 4A:
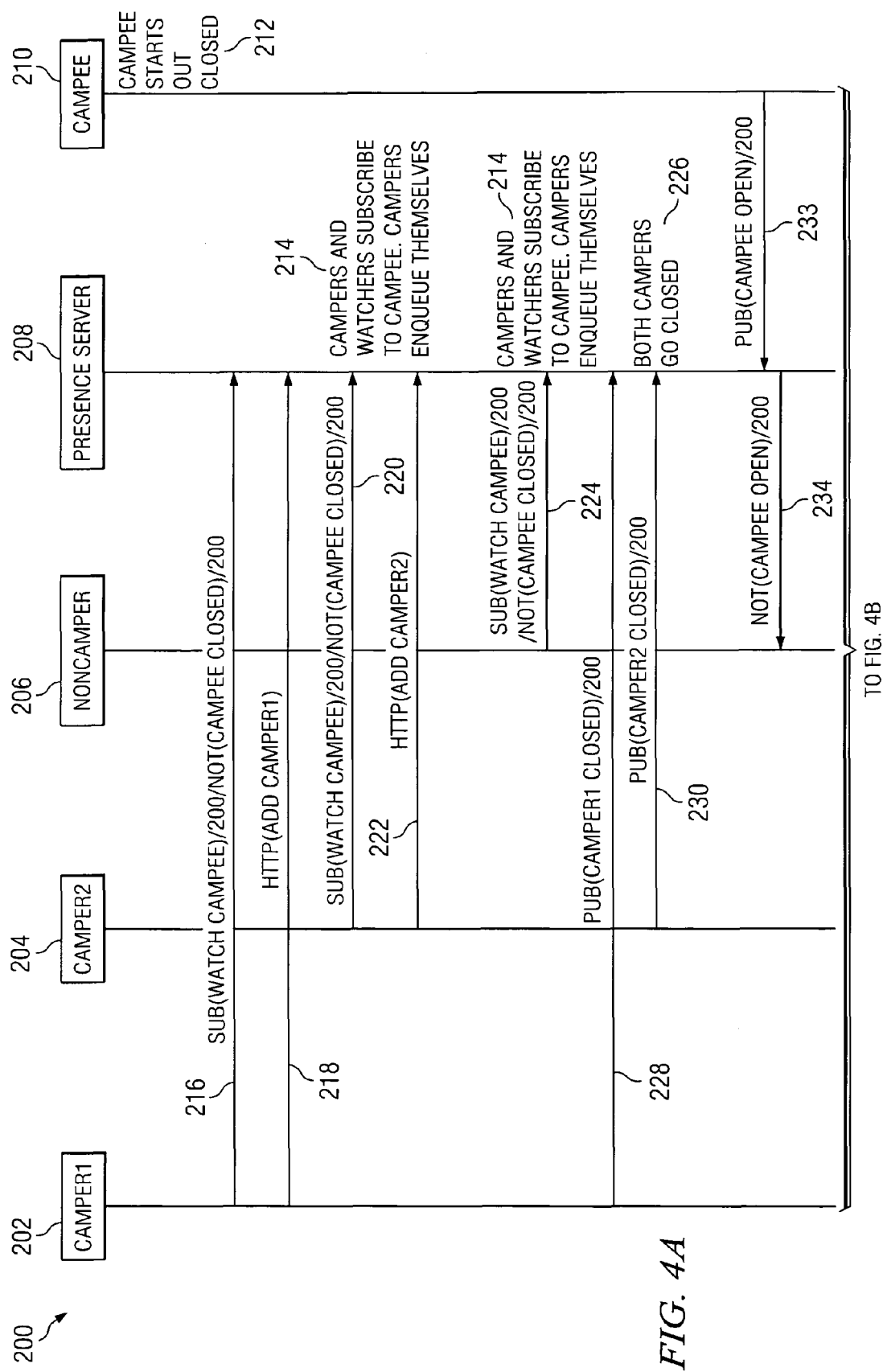
FIGS. 4A through 4C are charts illustrating operation of the system of FIG. 1 according to some of the teachings of the invention.
Figure 4B:
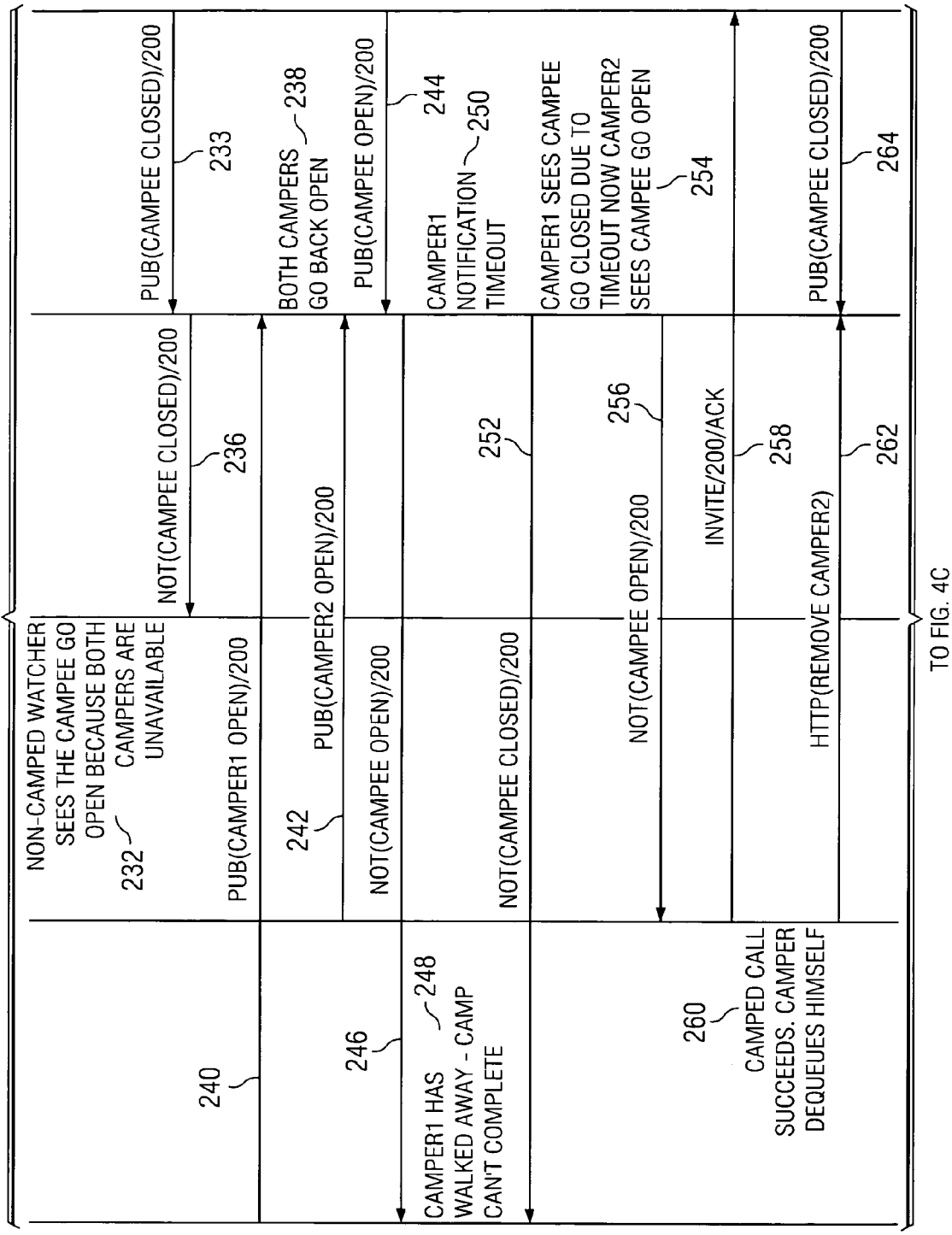
Figure 4C:
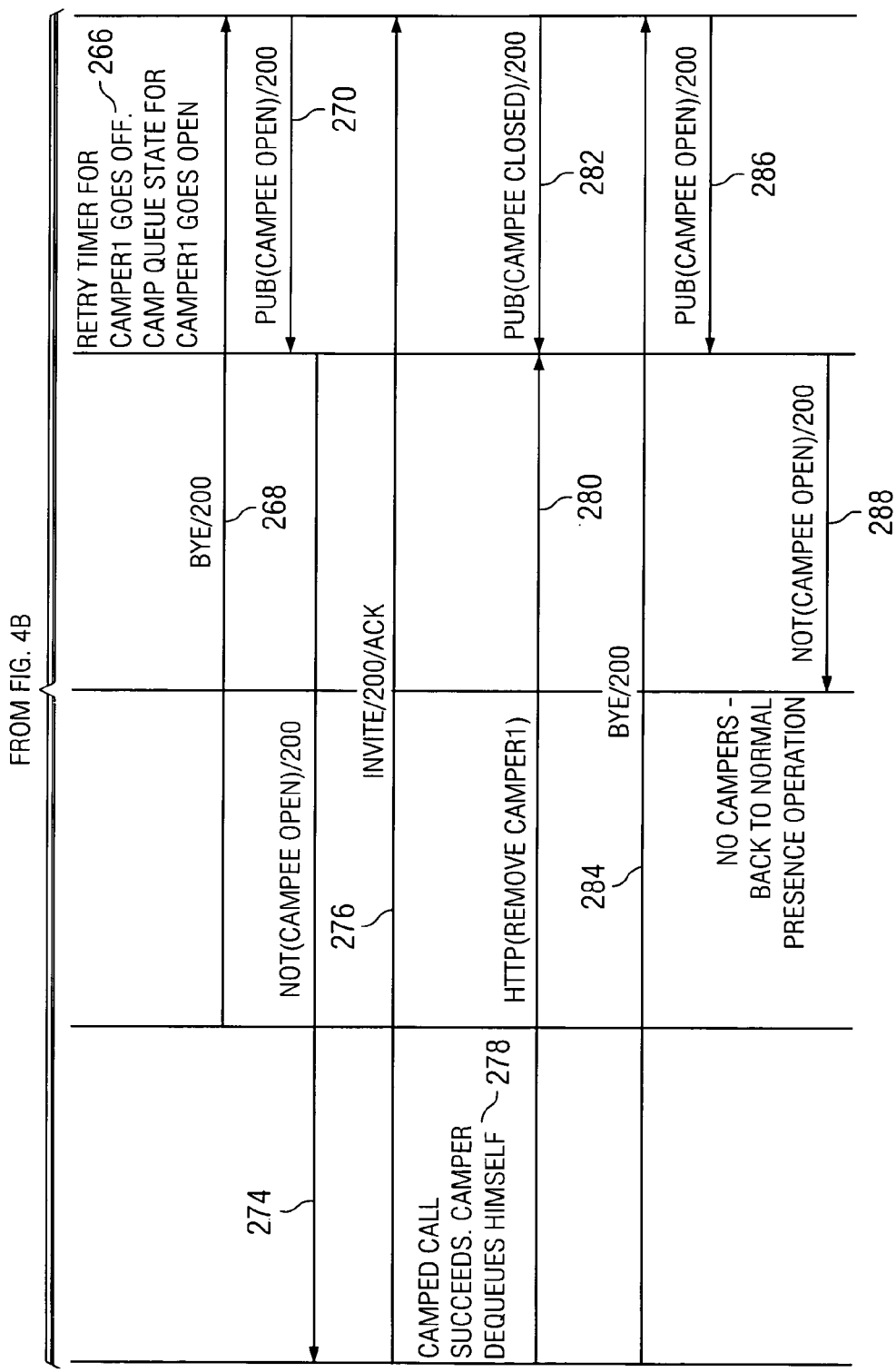

FIGS. 4A, 4B, and 4C are charts illustrating various actions that may occur according to some embodiments of the invention in an example in which two campers wish to camp on the same campee. In this chart, the vertical lines correspond to actions taken by camper 602, camper 604, non-camper 606, presence server 608 having a queue filter implemented, and campee 210. A non-camper, such as non-camper 606 may be an instant message client, for example. The below example is a SIP/SIMPLE example. Abbreviations utilized in FIGS. 4A-C include "SUB" which stands for SIP SUBSCRIBE request. The "/600", etc. notations are SIP response codes that flow back in the opposite direction of the arrow. "PUB" is a SIP PUBLISH request, and "NOT" is a SIP NOTIFY request.

Block 252 indicates that a campee starts out with a presentity status of closed. Block 255 indicates a series of actions involving camper 1 and camper 2 watching the campee and placing themselves in the camper queue. Specifically, at step 256 camper 1 sends a command to the presence server to watch the campee. At step 258, the camper 602 expresses a desire to add itself to the camper queue by an HTTP command. In this example, corresponding actions are taken by camper 604 at steps 210, 660, and 622. In addition, non-camper 606 initiates watching of campee 210 at step 664.

Block 666 indicates actions causing campers 602 and 604 to go closed, meaning that neither camper is available to conduct a call with campee 252. This is effected in this example by step 668 for camper 602 and step 230 for camper 604. As shown on FIG. 4B, block 232 indicates that the non-camped watcher 606 sees campee 210 go "open" because both campers are unavailable, as indicated by blocks 234 and 236. This is in response to the campee publishing a campee "open" presentity status at step 233. At step 640 and step 642 both campers go back "open" as indicated by block 238.

After the campee publishes an "open" status at step 644, camper 602, which is first in the queue, is notified of the "open" status of campee 210. According to this example, the camper 602 has walked away and the camped call cannot be completed as indicated at block 648. The presence server detects this at step 250 because camper 602 notification has timed out. In response, the presence server notifies camper 602 that the campee is closed because camper 602 has timed out as indicated by block 252. In addition, camper 604 is notified that the campee is open because camper 604 is next in the queue, as indicated at blocks 254 and 256.

At step 660, the camped call succeeds. In addition, camper 604 provides a signal de-queuing himself from the camped queue. This may be sent by the associated watcher, or through other suitable device. In this example, the queue command is an HTTP command sent to presence server 608. At step 664, the campee's status of "closed" is published to all campers, because the campee answered camper 604's call. At step 666 a retry timer for camper 602 expires and the camped queue state for camper 602 goes "open".

Continuing with the example, the call with camper 604 is concluded, as indicated by block 668, resulting in campee publishing to the presence server an "open" status which is in turn notified to camper 602 at step 274. In response, camper 602 places the call to campee 210, as indicated by block 276. Following successfully making the call, camper 602 dequeues himself from the camper queue as indicated by block 278 by sending an HTTP command, in this example, at step 680 to presence server 608. In response to the completion of the call, campee 210 publishes to presence server 608 a "closed" status at step 682. Continuing with the example, the call between campee 210 and camper 602 is completed, as indicated by block 684, resulting in the campee publishing its presentity status at step 686 to present server 608 and notification at step 688 to the non-camper 606 of the open status for campee 210. This notification is made because no campers remain in the queue and thus all non-camped entities granted access to the presentity status of campee 210.

It is important to note that the stages and steps in FIGS. 2 through 4C illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing eCamp™ functions.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints 12*a-d*. Using analogous reasoning, the routers and switches illustrated by FIG. 1 may be supplanted by bridges, gateways, or any other suitable devices that are conducive to network communications. In addition, while the foregoing discussion has focused on SIP, any other suitable session protocol may benefit from the teachings provided herein. The present invention is not confined to the SIP platform.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method comprising:
   receiving, at a presence server, a command to watch a first campee endpoint and a second campee endpoint, the command received from a plurality of camper endpoints currently camping on the first campee endpoint and the second campee endpoint;
   determining that the first campee endpoint has a presence state that is currently available to participate in a communication session with the camper endpoints, the first campee endpoint, and the second campee endpoint;
   determining that the second campee endpoint has a presence state that is currently available to participate in the communication session;
   setting a timer in response to the first and second campee endpoints being available;
   notifying a first camper endpoint of the availability of the first and the second campee endpoints when the timer expires by:
      sending a first status indicator to the first camper endpoint indicating that the first campee endpoint has a presence state that is currently available; and
      sending a second status indicator to the first camper endpoint indicating that the second campee endpoint has a presence state that is currently available; and
   notifying a second camper endpoint of the availability of the first and the second campee endpoints if the first camper endpoint fails to complete a call to the first and the second campee endpoints by sending the first and the second status indicators to the second camper endpoint.

2. The method of claim 1, further comprising:
   receiving an indication to initiate the communication session from the first camper endpoint; and
   initiating the communication session.

3. The method of claim 1, further comprising:
   initiating a display of a conference button at the first camper endpoint, the conference button configured to be selected to initiate the communication session.

4. The method of claim 1, further comprising:
   initiating the communication session when the first camper endpoint, the first campee endpoint, and the second campee endpoint are available.

5. The method of claim 1, further comprising:
   notifying the first camper endpoint according to priority value for the first camper endpoint, the priority value indicating the order in which the first camper endpoint should be notified with respect to a plurality of other camper endpoints.

6. The method of claim 1, further comprising:
   in response to receiving the first status indicator, automatically initiating contact between the first camper endpoint and the first campee endpoint.

7. The method of claim 1, the determining that the first campee endpoint has a presence state that is currently available further comprising:
   aggregating a plurality of status indicators of a plurality of endpoints of a user of the first campee endpoint.

8. The method of claim 1, further comprising:
   initiating a display at the first camper endpoint of a plurality of status indicators of a plurality of endpoints that share a common character trait with the first campee endpoint.

9. The method of claim 1, further comprising:
informing the first camper endpoint, the first campee endpoint, and the second campee endpoint that the communication session is outstanding.

10. An apparatus comprising:
a memory configured to store a command to watch a first campee endpoint and a second campee endpoint, the command received from a plurality of camper endpoints currently camping on the first campee endpoint and the second campee endpoint; and
one or more processors configured to:
determine that the first campee endpoint has a presence state that is currently available to participate in a communication session with the camper endpoints, the first campee endpoint, and the second campee endpoint;
determine that the second campee endpoint has a presence state that is currently available to participate in the communication session;
set a timer in response to the first and second campee endpoints being available:
notify a first camper endpoint of the availability of the first and the second campee endpoints when the timer expires by:
sending a first status indicator to the first camper endpoint indicating that the first campee endpoint has a presence state that is currently available; and
sending a second status indicator to the first camper endpoint indicating that the second campee endpoint has a presence state that is currently available; and
notify a second camper endpoint of the availability of the first and the second campee endpoints if the first camper endpoint fails to complete a call to the first and the second campee endpoints by sending the first and the second status indicators to the second camper endpoint.

11. The apparatus of claim 10, the one or more processors further configured to:
receive an indication to initiate the communication session from the first camper endpoint; and
initiate the communication session.

12. The apparatus of claim 10, the one or more processors further configured to:
initiate a display of a conference button at the first camper endpoint, the conference button configured to be selected to initiate the communication session.

13. The apparatus of claim 10, the one or more processors further configured to:
initiate the communication session when the first camper endpoint, the first campee endpoint, and the second campee endpoint are available.

14. The apparatus of claim 10, the one or more processors further configured to:
notifying the first camper endpoint according to priority value for the first camper endpoint, the priority value indicating the order in which the first camper endpoint should be notified with respect to a plurality of other camper endpoints.

15. The apparatus of claim 10, the one or more processors further configured to:
in response to receiving the first status indicator, automatically initiate contact between the first camper endpoint and the first campee endpoint.

16. The apparatus of claim 10, the one or more processors further configured to determine that the first campee endpoint has a presence state that is currently available by:
aggregating a plurality of status indicators of a plurality of endpoints of a user of the first campee endpoint.

17. The apparatus of claim 10, the one or more processors further configured to:
initiate a display at the first camper endpoint of a plurality of status indicators of a plurality of endpoints that share a common character trait with the first campee endpoint.

18. The apparatus of claim 10, the one or more processors further configured to:
inform the first camper endpoint, the first campee endpoint, and the second campee endpoint that the communication session is outstanding.

* * * * *